Dec. 4, 1934.  B. G. CARLSON  1,982,637
DIRECTIONAL GYROSCOPE
Filed April 29, 1931
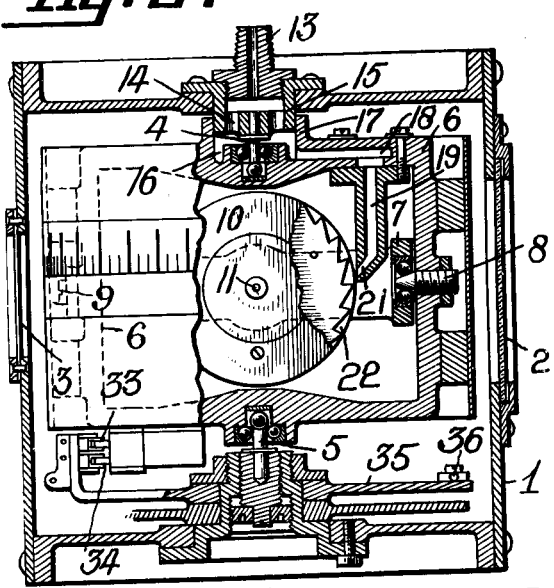
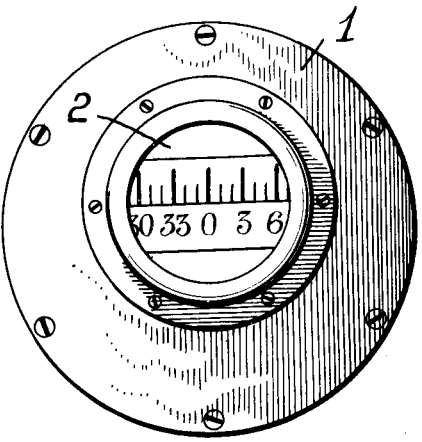
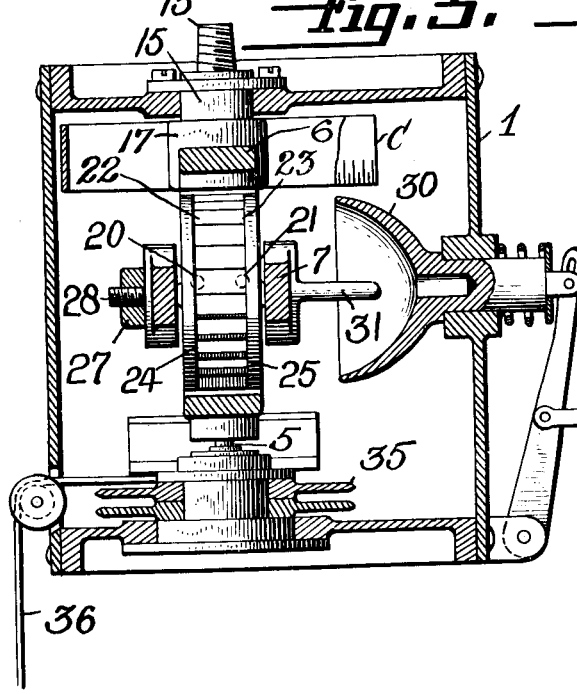
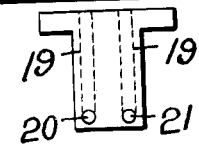
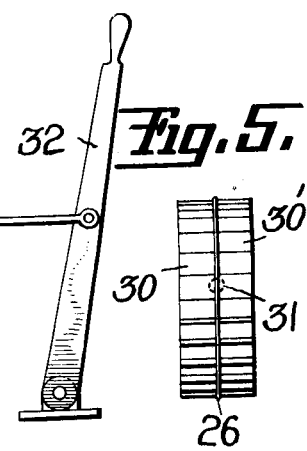
INVENTOR
Bert G. Carlson.
BY Herbert H. Thompson
his ATTORNEY.

Patented Dec. 4, 1934

1,982,637

UNITED STATES PATENT OFFICE

1,982,637

DIRECTIONAL GYROSCOPE

Bert G. Carlson, Elmhurst, N. Y., assignor to Sperry Gyroscope Company, Inc., Brooklyn, N. Y., a corporation of New York Application April 29, 1931, Serial No. 533,648

10 Claims. (Cl. 74—5)

This invention relates to gyroscopes possessing three degrees of freedom. A well known example of such type of gyroscope is the directional gyroscope employed for steering torpedoes and aircraft, and to some extent in aircraft as direction indicators for replacing or supplementing the compass and/or the turn indicator. While the magnetic and earth inductor compasses are fairly satisfactory for straight courses, they become practically useless during turning or rapid acceleration of an airship and during maneuvers. A free gyroscope on the other hand will maintain its direction regardless of such maneuvers but the application of a free gyroscope to airplanes has heretofore been limited on account of the fact that the gyroscope would not maintain its direction for more than a few minutes. One of the principal causes of deviation has been that such gyroscopes have a tendency to become inclined to the horizontal due to the rotation of the earth and other causes so that in a comparative short time they lose their directive value. Also free gyroscopes stray in azimuth in most latitudes for like reasons. Accordingly it has been proposed to mechanically centralize the gyroscope by a caging device to reset it at intervals. Such a device, however, is usually manually operated, requires occasional attention on the part of the operator, and temporarily destroys the value of the gyroscope as a direction indicator. It is the purpose of the present invention to provide a means which automatically maintains the gyroscopic spinning axis substantially horizontal without interfering with its position in azimuth. My invention is especially adapted to the air spun type of gyroscope and I preferably obtain a centralizing force by the reaction of the air jet drive for preventing tilting. It is obvious, however, that my invention has a broader application than to directional air driven gyroscopes and may be employed on other types of free or partially free gyroscopes and other types of drive than air driven gyroscopes. In addition, adjustable weights may be employed to prevent straying in azimuth.

Referring to the drawing showing the preferred embodiment of my invention,

Fig. 1 is a front elevation of the face of my directional gyroscope as mounted on the instrument board of an airplane.

Fig. 2 is a vertical section of the same showing a portion of the card in elevation.

Fig. 3 is a sectional elevation taken at right angles to Fig. 2 of a slightly modified form of the invention.

Fig. 4 is a detail of the air jets or nozzles.

Fig. 5 illustrates diagrammatically a modification using but a single jet instead of a plurality of jets.

My directional gyroscope is shown as enclosed within a casing 1 having a front window 2 and an aperture 3 closed by wire gauze through which the used air from the air drive may escape. Within the casing is pivoted on vertical axis 4—5 a vertical ring 6 and within said vertical ring is mounted a rotor bearing frame 7 on horizontal trunnions 8 and 9. The gyro rotor proper 10 is journalled on a horizontal spinning axis 11 in said frame 7, the axis 11 being preferably at right angles to the axis 8—9. Such a mounting is said to give the gyroscope three degrees of freedom, which, in this instance, comprises freedom about the vertical axis, the horizontal axis of oscillation, and the horizontal axis of spin. It is obvious that these axes may be interchanged or varied at will and still have three degrees of freedom or any equivalent mounting employed. A compass card C (Fig. 2) or $C^1$ (Fig. 3) may be mounted on the vertical ring.

The rotor is shown as provided with buckets or blades 22 in the periphery thereof by which the rotor is driven from one or more air jets. Either a pressure or vacuum system may be employed for the drive, but in this instance we have shown a pressure drive, the air being taken in through a hose (not shown) coupled to hose coupling 13 and passing from thence to channels 14 in the sleeve member 15, thence into the space 16 in the outer sleeve 17 on the vertical ring, and thence through the passage way 18 into the plurality of channels 19 leading to the jets 20—21.

As stated above, I prefer to employ a plurality of jets, in the instance illustrated, two, which are preferably placed side by side in the same horizontal plane and slightly above the horizontal plane of the trunnions 8—9 so that the jets strike the bottom of the buckets approximately in the horizontal plane of the trunnions 8—9. By so positioning the jets an effective drive is obtained even if a large temporary relative inclination of the gyro rotor and vertical ring occurs. The jets are also positioned preferably an equal distance to each side of the central vertical plane of the rotor, or in other words, the vertical plane containing the pivots 8—9. Preferably the buckets do not extend entirely across the face of the rotor but terminate so as to form an end wall or shoulder 23 at each end of each bucket. In other words, there extends around the edge of the rotor on each side a circumferential wall 24—25, the inner edge 23 of each wall lying adjacent the outer edge of the spaced jets 20—21.

During normal operation when the gyro rotor is vertical the two jets engage the bottom of the buckets only and little or no reaction is exerted against the end walls thereof or circumferential walls. If, however, the rotor becomes inclined, say in a clockwise direction in Fig. 3, it will readily be seen that both the jets 20 and 21 will exert a lateral thrust on the side wall 25 as a result of the direct component of the reaction from jet 21 at right angles to the plane of the side wall 25 and a secondary component of the reaction of the air jet 20 after first striking the inclined bucket and being deflected against the side wall 25, the components of both jets, therefore, operating in the same direction to exert a torque about the vertical axis 4—5 which tends to turn the forward portion of the rotor to the right in Fig. 3. Since the rotor is revolving downwardly, this torque causes the gyroscope to precess about its horizontal axis in a direction to restore it to its vertical position. Similarly upon inclination in the opposite direction, the jets 20 and 21 act on the end wall 24 to cause return of the rotor to vertical position. By having the jets positioned closely adjacent the end walls a very sensitive control is obtained and the rotor prevented from leaving its vertical position by more than a few degrees, thus keeping it at all times in the most favourable position for a maximum directive force and for minimum disturbance from rolling and pitching of the airplane.

An erecting torque may also be secured by a single jet as well as a plurality. Thus in Fig. 5 I have illustrated a rotor in which the blades 30, 30' may extend entirely across the periphery thereof but in which the blades are provided with end walls near the middle of the rotor face instead of at the edges. Stated in a different way the blades may be said to be bisected by a central circumferential wall 26, preferably having a knife edge periphery. A single jet 31 is placed so that the air stress therefrom is bisected by this wall, the jet being also preferably placed so that the air stream strikes the buckets in the same horizontal plane with the horizontal trunnions 8—9. As long as the gyro is vertical a spinning torque only is exerted on the rotor but as soon as it becomes inclined it will readily be seen that a side push will be exerted on this wall about the vertical axis similarly to the preferred form of the invention.

For preventing the rotation of the earth from causing apparent straying in azimuth I prefer to employ an adjustable mass 27 threaded on stem 28 extending from ring 7. By adjusting this according to latitude, deviation from this cause may be eliminated. By my invention, therefore, a directional gyroscope is obtained which will hold direction for a comparatively long period and which retains the advantage of remaining operative under the conditions which render the magnetic and earth inductor compasses useless, namely, rapid turning, acceleration and other maneuvers.

When the gyroscope is shut down it may be locked or caged as by means of the bell mouthed cage 30 which engages the centralizing pin 31 on the horizontal ring. The cage may be manually operated as by lever 32. This type of gyroscope may be used either as a direction indicator or as a baseline for automatic steering of aircraft. In the latter case control contacts 33 are placed at the base of the gyroscope cooperating with trolleys 34 on the swivel arm 35 to which a follow-up connection may be imparted by means such as follow-up cable 36.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A centralizing or erecting device for the gyro rotor and rotor bearing frame of a free directional gyroscope comprising a plurality of air jets for spinning the rotor spaced axially at the periphery of the rotor and to each side of the center line of support of the rotor bearing frame, cooperating blades on said rotor, and means other than the rotor blades for receiving a lateral thrust from the air stream from at least one of said jets upon inclination of the rotor bearing frame to exert a torque around the vertical axis of the rotor.

2. A self-erecting, air-spun directional gyroscope comprising a rotor having buckets around the periphery but extending only part way across the face of the rotor, means for mounting the rotor for oscillation about a horizontal axis and turning about a vertical axis, and a pair of rotor spinning jets spaced horizontally and having one of said pair positioned adjacent each end of the buckets adjacent said horizontal axis of oscillation whereby, upon inclination of said rotor with respect to said jets, the air stream from at least one of said jets exerts a torque about the vertical axis of the rotor by impingement against the adjacent end walls of the buckets.

3. A self-erecting, air-spun directional gyroscope comprising a rotor having buckets around the periphery, means for mounting the rotor for oscillation about a horizontal axis and turning about a vertical axis, means for driving the rotor and erecting the same including at least one jet located adjacent said horizontal axis, and at least one circumferential wall extending around the rotor and adapted to be impinged by the air stream from said jet upon inclination of the rotor about said horizontal axis to exert a torque about the vertical axis of the rotor.

4. A self-erecting, air-spun directional gyroscope comprising a rotor having buckets around the periphery, means for mounting the rotor for spinning about a horizontal axis, for oscillation about a second horizontal axis and turning about a vertical axis, a plurality of horizontally spaced jets for driving the rotor located adjacent said horizontal axis, and circumferential walls extending around the rotor and adapted to be impinged by the air streams from said jets upon inclination of the rotor about said axis to exert a torque about the vertical axis of the rotor.

5. A self-erecting, air-spun directional gyroscope comprising a rotor having buckets around the periphery with an end wall for each bucket, means for mounting the rotor for oscillation about a horizontal axis and turning about a vertical axis, and a pair of jets for spinning the rotor spaced horizontally and having one of said pair positioned adjacent each end of the buckets adjacent said horizontal axis of oscillation whereby, upon inclination of said rotor with respect to said jets, the air stream from one of said jets exerts a torque about the vertical axis of the rotor by reaction against the adjacent end walls of the buckets.

6. A self-erecting free gyroscope comprising a rotor having buckets around the periphery thereof, means for mounting the same for freedom of movement about a plurality of axes, means for spinning the rotor and erecting the same including at least one jet located adjacent one of said axes, means for mounting the jet on a part of said gyroscope movable about only the remaining of said axes, and at least one circumferential wall extending around the rotor and adapted to be laterally impinged by the air stream from said jet upon relative inclination of the rotor and the direction of the said stream to exert a torque on the rotor causing direct elimination of the tilt.

7. A self-erecting free gyroscope comprising a rotor having buckets around the periphery thereof, means for mounting the same for freedom of movement about a plurality of axes, a jet for spinning the rotor located adjacent one of said axes, means for mounting the jet on a part of said gyroscope movable about only the remaining of said axes, and a circumferential wall extending around the middle of the rotor to bisect the air stream from same jet and adapted to be laterally impinged by said stream upon relative inclination of the rotor and the direction of the jet to exert a torque on the rotor about another of said axes causing direct elimination of the tilt.

8. In a centralizing or erecting device for the gyro rotors of gyroscopes having three degrees of freedom, the combination with the rotor, and means for mounting it for freedom about precession axes perpendicular to the rotor axis, of a plurality of air jets for spinning said rotor mounted on said mounting means to partake of turning of the rotor about one but not the other of said precession axes, said jets being to each side of said other precession axis, and means on said rotor for receiving a lateral thrust from the air stream from at least one of said jets upon inclination of said rotor with respect to said jets.

9. In a centralizing or erecting device for the gyro rotors of gyroscopes having three degrees of freedom, the combination with the rotor, and means for mounting it for freedom about precession axes perpendicular to the rotor axis, of means for spinning said rotor and erecting the rotor including at least one air jet mounted on said mounting means to partake of the turning of the gyroscope about one but not the other of said precession axes, and means on said rotor for receiving a lateral thrust from the air stream from said jet upon inclination of said rotor with respect to said jet.

10. A self-erecting directional gyroscope comprising a rotor having buckets around the periphery thereof, a rotor bearing frame, a vertical ring rotatably mounted about a vertical axis and in which said frame is mounted for oscillation about a horizontal axis, a rotor spinning jet mounted on said ring adjacent said horizontal axis, and a wall around said buckets for receiving a lateral thrust from the air stream from said jet to erect the gyroscope upon inclination about said horizontal axis.

BERT G. CARLSON.